(12) United States Patent
Ming et al.

(10) Patent No.: US 12,430,974 B2
(45) Date of Patent: Sep. 30, 2025

(54) EYE-GAZE BASED INTELLIGENT DOOR OPENING SYSTEM

(71) Applicant: HID Global Corp., Austin, TX (US)

(72) Inventors: Jing Ming, Abington, PA (US); Robert Kjell Rowe, Poulsbo, WA (US)

(73) Assignee: HID Global Corp., Austin, TX (US)

( * ) Notice: Subject to any disclaimer, the term of this patent is extended or adjusted under 35 U.S.C. 154(b) by 46 days.

(21) Appl. No.: 18/324,353

(22) Filed: May 26, 2023

(65) Prior Publication Data

US 2024/0395093 A1 Nov. 28, 2024

(51) Int. Cl.
*G07C 9/37* (2020.01)
*G06V 10/82* (2022.01)
*G06V 40/16* (2022.01)
*G06V 40/18* (2022.01)
*G06V 40/20* (2022.01)

(52) U.S. Cl.
CPC .............. *G07C 9/37* (2020.01); *G06V 10/82* (2022.01); *G06V 40/169* (2022.01); *G06V 40/171* (2022.01); *G06V 40/18* (2022.01); *G06V 40/20* (2022.01)

(58) Field of Classification Search
CPC ........ G07C 9/37; G06V 10/82; G06V 40/169; G06V 40/171; G06V 40/18; G06V 40/20
See application file for complete search history.

(56) References Cited

U.S. PATENT DOCUMENTS

| | | | |
|---|---|---|---|
| 11,144,754 B2 * | 10/2021 | Hu | G06F 3/013 |
| 11,205,314 B2 | 12/2021 | Venetianer et al. | |
| 11,594,072 B1 * | 2/2023 | Trani | G06V 20/52 |
| 11,681,364 B1 * | 6/2023 | Zhang | G06N 3/0455 |
| | | | 345/156 |
| 11,989,971 B2 * | 5/2024 | Riviere | H04N 23/56 |
| 2021/0287469 A1 * | 9/2021 | Ryhorchuk | G06V 40/172 |

(Continued)

FOREIGN PATENT DOCUMENTS

| WO | 2022128623 | 6/2022 |
|---|---|---|
| WO | 2024249266 | 12/2024 |

OTHER PUBLICATIONS

"International Application Serial No. PCT US2024 030832, Invitation to Pay Additional Fees mailed Sep. 3, 2024", 13 pgs.

(Continued)

*Primary Examiner* — Curtis A Kuntz
*Assistant Examiner* — James E Munion
(74) *Attorney, Agent, or Firm* — Schwegman Lundberg & Woessner, P.A.

(57) ABSTRACT

Systems and techniques may be used for allowing a person access to a secure area, opening a door, or the like. A technique may include detecting a person within a particular distance of a secure area, capturing, using a camera, a set of images of at least a facial feature of the person, preprocessing the set of images to identify the facial feature in at least one image of the set of images, and identifying, using processing circuitry, a gaze status of the person based on the identified facial feature in the at least one image. The technique may include determining, using a trained machine learning model, an intent of the person to access the secure area based on the gaze status, and based on determining the intent, granting access to the secure area.

19 Claims, 5 Drawing Sheets

(56) References Cited

U.S. PATENT DOCUMENTS

2022/0012968 A1    1/2022  Hartman et al.
2023/0045699 A1*   2/2023  Shain .................... G07C 9/38

OTHER PUBLICATIONS

"International Application Serial No. PCT US2024 030832, International Search Report mailed Oct. 25, 2024", 6 pgs.
"International Application Serial No. PCT US2024 030832, Written Opinion mailed Oct. 25, 2024", 10 pgs.

* cited by examiner

FIG. 5

EYE-GAZE BASED INTELLIGENT DOOR OPENING SYSTEM

BACKGROUND

Physical access control systems may be used to restrict entry to physical spaces and permit entry to authorized individuals. For example, physical access control systems may control access to a room, a floor, a building, a safe (e.g., a floor safe, a wall safe, a freestanding safe, etc.), a cabinet, a vehicle, a case, etc. In some systems, a user device, a badge, or a card and an access control device are used, where the user device, badge, or card are read or communicate with the reader (e.g., using a short distance communication technique, via wireless communication, etc.). The access control device may determine whether the user device has proper authorization or authentication to access the controlled physical area. The access control device may unlock a lock (e.g., a door lock) in response to determining that the user device includes or has provided proper authorization or authentication.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

The systems and techniques described herein provide for eye-gaze based intelligent door opening. Human behavior is complex. When people approach a door or a secure area, they may not intend to open the door or access the secure area, but instead intend only to pass by it, chat near it, or run errands around it, for example. Current access control systems that rely on proximity will unlock or open the door improperly when there is no such need. These unnecessary door openings may increase a security risk, cause excess wear and tear of electromechanical parts, or consume unnecessary electrical power.

A camera-based system may be used to detect a proximity of a person, and capture body movement or a facial expression of the person. One or more face images acquired by a camera may be used to determine an intent of the person more accurately. Face orientation and movement speed may be helpful for detecting intentions, but may still be incorrect about the intent of a person. For example, a person may walk up to a door and stop, intending to perform an action near the door (e.g., grab some candy from a desk located next to the door). Accordingly, a more accurate detection of a person's intent is desired.

The systems and techniques described herein may be used to automatically detect a person's intentions related to a door or secure area. Eye gaze is an important non-verbal communication cue because it contains rich information of human intent. By analyzing sequential eye gaze through two or more images of a face, the systems and techniques described herein may more accurately determine intent to open a door or access a secure area.

In example existing eye tracking systems, a camera with infrared illuminators are used. These eye tracking systems may perform corneal reflection photography. When a single eye is directed to fixate on a small point of light, that light creates a reflection off of the front surface (cornea) of the eyeball. For a camera located very close to this light source, when a person is focused on the camera, the corneal reflection will appear to be located in the center of the pupil. As the person moves the fixation to the right, left, up, or down with respect to the light, the corneal reflection is captured by the camera as displaced relative to the center of the pupil.

One limitation of a corneal reflection pupil center-based eye tracking system is that it requires a user-specific calibration process to adjust the linear model parameters of gaze projection and also allows for only very small head movement during the gaze estimation, which may inconvenience users or result in inaccurate or indeterminate readings. Also, the accurate gaze projection may only be achieved at a very short distance (e.g., within 0.5 meters). For an automatic door opening system, user-specific calibration is highly undesirable, the subjects approach the door or secure area from different angle paths, walk freely without any constraints on head movement, and may be located further away than half a meter.

The systems and techniques described herein provide a technical solution to the technological problem of long-range gaze estimation without a calibration process. The technical solution may be based on gaze to determine a person's intention related to a door or secure area. In an example, a door may include any obstacle, material, or barrier that prevents a person from traversing a doorway (e.g., a framed area), such as an automatic door (e.g., a sliding door), a locked door, a partial barrier, a revolving door, a gate, or the like. The door may include a wooden door, a metal door, a glass door, etc. A secure area or secured area may include any area where a person is prevented from accessing (e.g., by a door as described above, a bar, a fence, a laser, an alarm trigger, etc.).

The systems and techniques described herein incorporate eye gaze estimation into an automatic door opening or secure access system. The systems and techniques described herein may be used to capture a person's eye movement or gaze status when approaching a door or secure area. A person's focusing on a camera near a door or access way to a secure area may be used to trigger the door to open or unlock or the secure area to otherwise become accessible.

Figure 1:
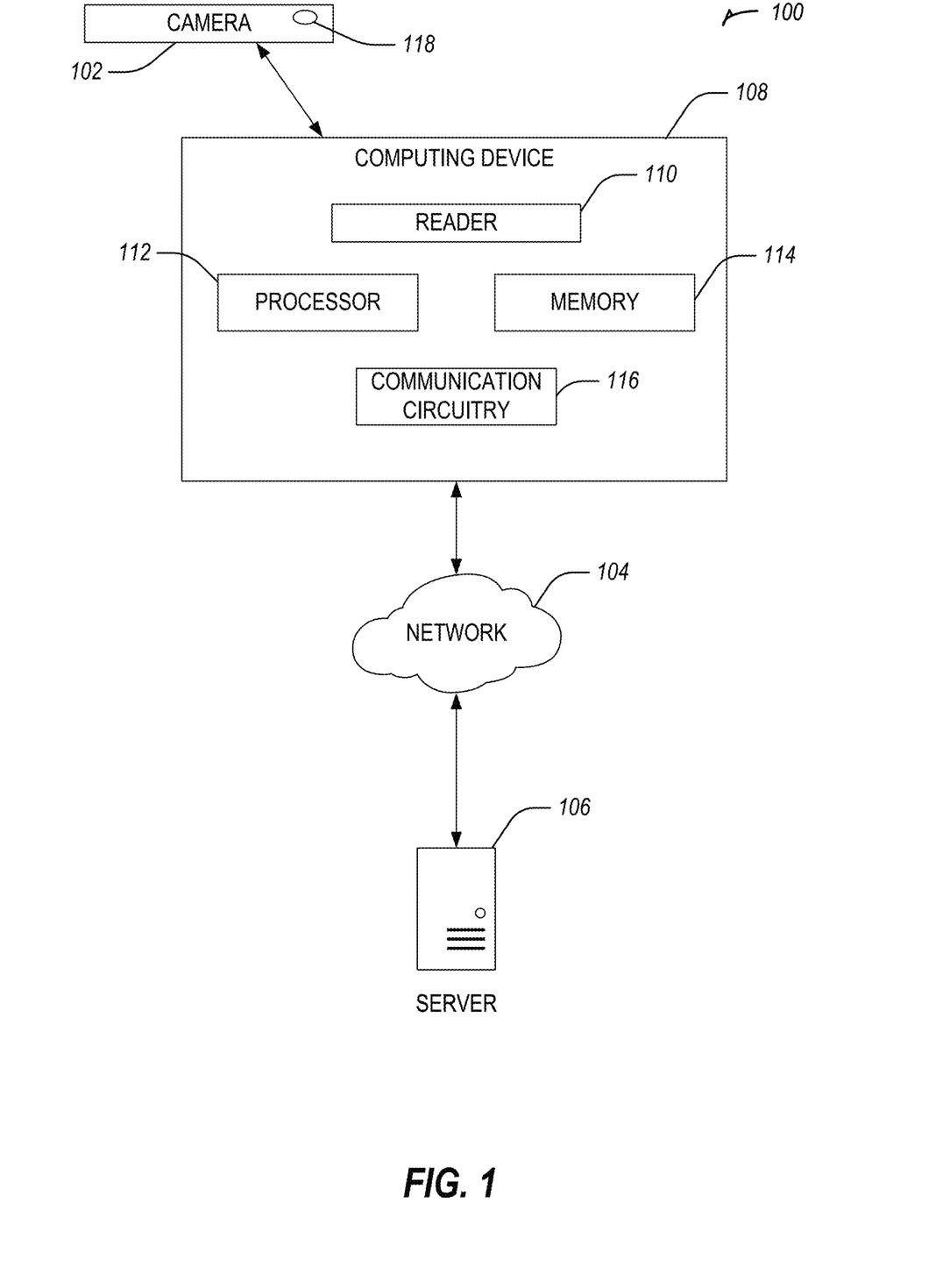
FIG. 1 illustrates a system for determining access intent in accordance with some embodiments.

FIG. 1 illustrates a system 100 for determining access intent in accordance with some embodiments. The system 100 includes a computing device 108 in communication with a camera 102, which may be incorporated into the computing device 108 or separate from the computing device 108. The computing device 108 may include a reader 110 (e.g., for authenticating a user), a processor 112, memory 114, or communication circuitry 116. The computing device 108 may optionally communicate with a server 106 via a network 104 (e.g., for authentication of a user).

The camera 102 may be used to record face or eye region images. The images may be captured at a distance of two to three meters in some examples. In other examples, the images may be captured at a distance of a few inches to five to ten meters. The camera may capture these images, which may be processed by the computing device 108 to perform long-range gaze estimation. The gaze estimation may be used to detect intention of a person in the captured images quickly enough to allow a seamless door opening experience. The aperture, focal length and focusing point of a lens of the camera may be configured to allow around a two-meter depth of field in front of the door or secure area. However, the aperture, focal length and focusing point of a lens of the camera may be configured to allow any other suitable depth of field in front of the door or secure area. A global shutter camera sensor of the camera 102 may be used for imaging a fast-moving object (e.g., a person). The camera 102 may have a relatively high resolution to capture fine details of eye movement of a person at a distance, including, in some examples, distances up to five to ten meters or more. In some examples, the original eye region image resolution may be higher than 50×50 pixels when a person is at a distance of two meters. In some examples, the camera 102 is near infrared (NIR) sensitive. The camera 102 may include an illuminator, such as, for example, an infrared illuminator, to induce a bright corneal reflection in the eye far away. In some embodiments this illuminator may be a light source 118. In some embodiments the illuminator may be a separate component from camera 102. The location of bright corneal reflection relative to the pupil center may be used as a feature for gaze estimation. In some examples, multiple infrared illuminators may be used to estimate a head orientation of a person based on multiple corneal reflection points. Gaze status may be used with head orientation to determine an intent of the user.

The camera 102 may provide an approximate distance between the person and the imaging sensor, such as when the camera 102 is a 3D camera or a RGB-D camera. Head orientation or gaze status may be generated via a depth image of an eye surface and eye region appearance image. In other examples, an approximate distance between the person and the imaging sensor may be provided by other means, including, in some examples, radar, lidar, or other camera(s). The camera 102 or system 100 may include an embedded Ultra-wideband (UWB) component. UWB is a radio technology used in real time location service. When the user approaches the door, the UWB component may provide the distance between the person and the camera 102 or an angle of a vector representing the distance related to the camera 102. These measurements may be used as condition features for a gaze estimation model.

A typical eye tracking system maps the location of a gaze into a projected field based on an estimated gaze orientation vector. The computing device 108 may avoid needing to obtain a detailed gaze location in the projected field, and instead categorize a gaze into one of two types: gaze on the door (or secure area) and gaze not on the door (or secure area). Due to this simplified categorization, the gaze classification may be implemented without requiring a user-specific calibration process. Training data that includes large amounts of diverse subjects with different eye geometry may be used to make the system more general and not require a calibration process for each user.

In an example, the camera 102 and a light source 118 may be integral to hardware of a door, for example as part of a door frame, pushbar, handles, etc. In this example, focusing on the door results in a very similar gaze movement as focusing on the embedded camera, especially for eyes that are far away. The gaze classification model may be simplified as classifying gaze on or not on the camera. In another example, the camera 102 may be a separate piece of hardware that is installed in proximity to the door, for example at a fixed location that varies from installation to installation. In this example, geometry measurements of the camera installation and door size may be used as condition parameters of a gaze classification model (e.g., a machine learning trained model). The location of the camera 102 may be modeled as 3D coordinates in space with an origin at a center of the door or entry to a secure area. The light source 118 may be a separate piece of hardware that is installed separately and in proximity to the door (or secure area), for example at a fixed location that varies from installation to installation. In this example, a light source location may be modeled as 3D coordinates in the same space stated above. Each light source location may be paired by a corresponding corneal reflection location in the eye image.

An intent of a person near the door may be represented via a probability of door opening intention. This may be determined by analyzing a sequence of images (e.g., frames of a video) and integrating the results. An example analysis may include extracting an eye region of a frame and calculating a brightest corneal reflection location and pupil center. In some examples, iris or cornea boundary points may be determined. These features may serve as inputs for a classification model. In some examples, linear regression or non-linear methods, such as Support Vector Machine with non-linear kernels, may be applied to classify the gaze status.

In some examples, a gaze status of an image may be estimated using a neural network that implements a deep-learning architecture such as a convolutional neural network (CNN). The layers of the neural network may extract features from eye region images or face images automatically. The data-driven features may be based on a training dataset. In some models, a head orientation vector may be generated based on a face image (e.g., using facial landmarks) or depth images of the eyeball, and this head orientation vector, together with user distance and angle may concatenate with features extracted from eye images, to be input into a classification part of the model.

A CNN may be trained to accommodate variations of camera 102 or light source 118 installment. For example, the CNN may be trained using a setup that includes one or more cameras or one or more light sources located at various points around a door or secure area. Human subjects may be asked to variously look at the door (or secure area) and look away while each of the one or more cameras or one or more light sources are active. The CNN model may be built using the data from different camera locations or light sources such that the CNN may predict intention under various optical conditions. The camera or light locations may significantly affect eye appearance images observed in the camera 102 or other distance parameters. A location vector transformed from the camera 102 or light source 118 3D coordinates may be concatenated with one or more other gaze related features to be input to the classification part of the model.

In some examples, a camera location or light source location may be labeled. In such cases, during installation the installer may specify the location of the camera 102 or the light source 118. The label of the training location nearest the installation location may be set as a model input. In these examples, a condition-CNN model may be built via transforming the camera and light source installation labels into a condition vector. These conditions may be shared with the same lower layers of the model that extract eye image related features. Each condition may have its own weights for the top-level layers which generate the final gaze status. The variation of the top-level layers represents the variant eye appearance images under different camera and light source locations, with the same gaze on the door (or secure area) status. A higher-level class label may dramatically reduce the amount of data needed for training.

A model (e.g., a CNN or other type of neural network) may be trained with simulated data, which may be generated using models of features of an eye (e.g., cornea, pupil, iris, etc.) that interact with optical models of the light source 118 and the camera 102. These data may be used for training or may be used to augment real training data.

After generating a gaze status of an image, the results of consecutive frames may be integrated to predict a final intention. In some examples, an N-out-of-M scheme may be used. For example, when there are N frames with gaze on the door status among a total M consecutive video frames, a door opening or secure area entering intention is predicted. In other examples, Bayesian inference may be used to predict a probability of the door opening (or secure area entering) intention for a next time point. The prior probability of consecutive gaze status output under different intention conditions may be generated using a training dataset. In some examples, a recurrent neural network (RNN) model may be built on top of the output of a CNN for a set of frames to predict a door opening (or secure area entering) probability in a sliding window.

In some examples, consecutive 2D frames may be considered for a 3-dimensional dataset with time as an extra dimension. One-step predictions may be made based on a temporal block. For example, such a data block may be input into a 3-dimensional convolutional network to generate the intention probability directly. In this example, a larger training dataset may be used for the complicated model with more trainable parameters.

Figure 2:
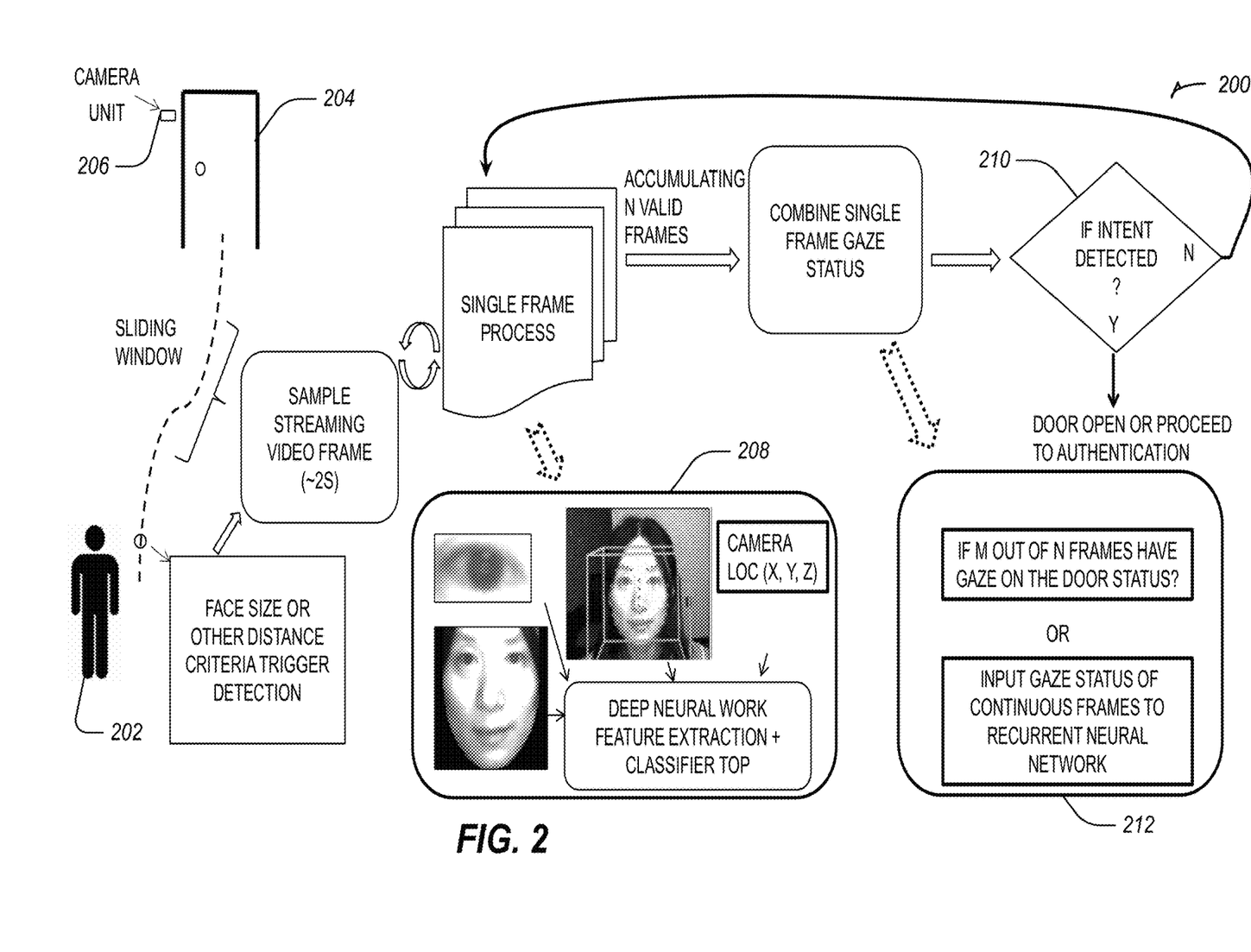
FIG. 2 illustrates a block diagram illustrating access intent processing in accordance with some embodiments.

FIG. 2 illustrates a block diagram 200 illustrating access intent processing in accordance with some embodiments. The block diagram 200 shows a person 202 near a door 204. The person 202 may be determined to be within a particular distance of the door 204, for example based on face size as captured by a camera unit 206 near the door 204, or via another distance criteria. In response to triggering this detection, video frames may be captured by the camera unit 206. The video frames may include two or more seconds of sampled streaming video frames. One or more captured frames may be processed (e.g., frame by frame) at block 208. At block 208, a deep neural network or other model may be used to perform feature extraction. A classifier may indicate gaze status. After M or more frames are processed at block 208, the M or more frames may be combined to determine a door opening intent at block 210. Block 212 includes one or more classifiers. In an example, a classifier may use a criteria of whether N out of M frames have a gaze status on the door 204 or secure area. In another example, a RNN may use gaze status of continuous frames as an input to determine the door opening intent. Based on an output of block 210, intent may be detected. When the intent is determined to be to open the door 204 or go into a secure area, the door 204 may be opened, authentication may be performed (in some examples, authentication may already have occurred), or the person 202 may otherwise be granted access. When the intent is determined to be to not open the door 204 or enter the secure area, further frames may be captured or processed (e.g., as long as the person 202 is within the particular distance of the door 204) to, e.g., determine whether the person 202 has developed an intent to open the door or enter the secure area.

Figure 3:
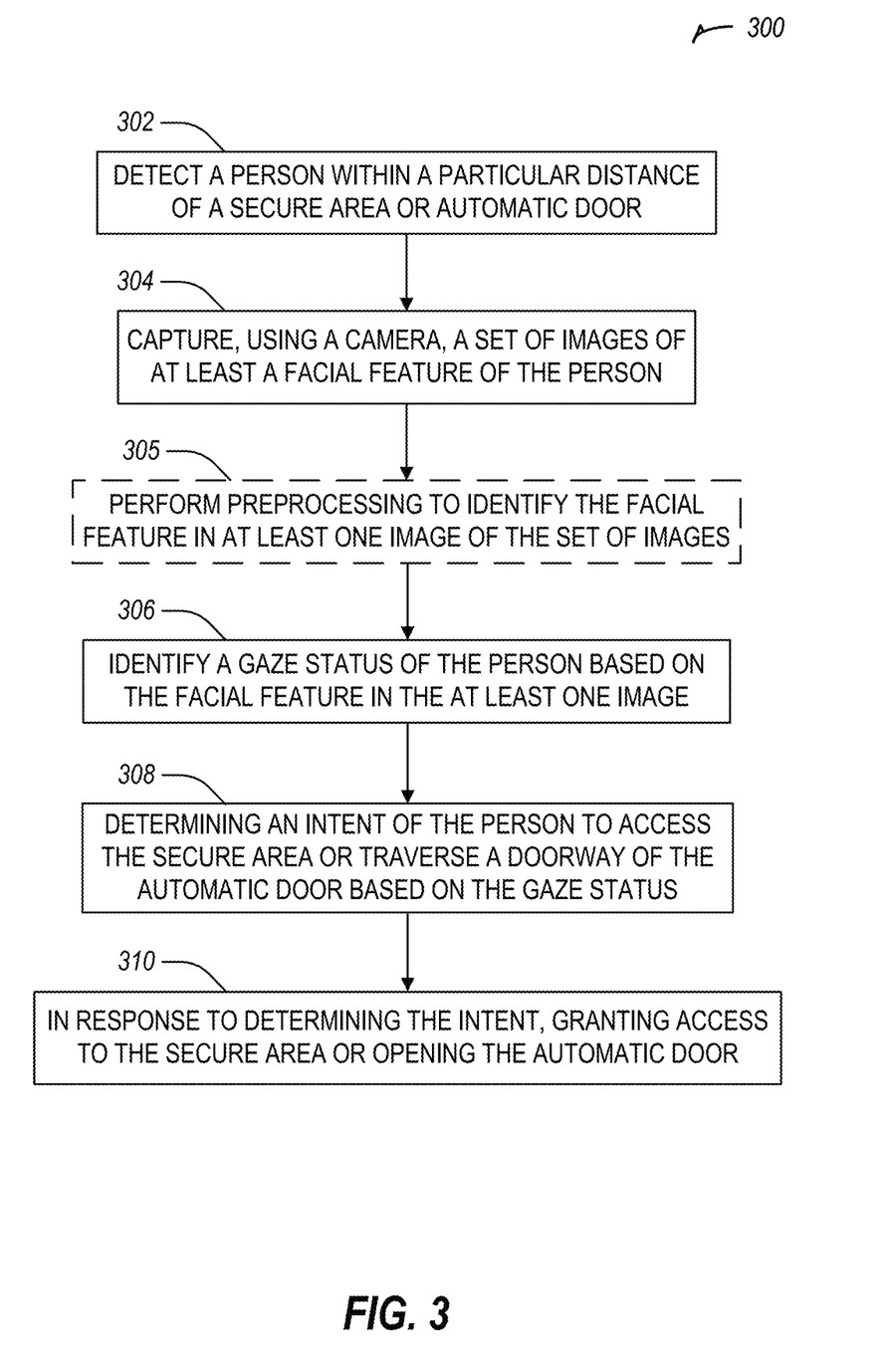
FIG. 3 illustrates a flowchart showing a technique for determining access intent in accordance with some embodiments.

FIG. 3 illustrates a flowchart showing a technique 300 for determining access intent in accordance with some embodiments. In an example, operations of the technique 300 may be performed by processing circuitry, for example by executing instructions stored in memory. The processing circuitry may include a processor, a system-on-a-chip, or other circuitry (e.g., wiring). For example, technique 300 may be performed by processing circuitry of a device (or one or more hardware or software components thereof), such as those illustrated and described with reference to FIG. 1.

The technique 300 includes an operation 302 to detect a person within a particular distance of a secure area or automatic door. Operation 302 may include determining a face size of the person (e.g., via one or more images captured by a camera) and comparing the face size to a threshold (e.g., when the face size is larger, the person is closer). Operation 302 may include receiving a communication from a device of the person and determining that the person is within a threshold proximity from the communication. In some examples, the communication device may include an embedded Ultra-wide band (UWB) unit to provide both the distance and angle relative to the intention detect unit. In other examples, the communication device may use Bluetooth low Energy (BLE), high-frequency radio frequency identifier (RFID) or other technologies that use time of flight to calculate the distance.

The technique 300 includes an operation 304 to capture, using a camera, a set of images of at least a facial feature of the person. In some examples, operation 304 may include capturing the set of images using two camera lenses that are cross polarized, which can be achieved by adding a pair of cross polarized filters on the lenses. The camera may be one or more of a visible light camera (e.g., color, black and white, etc.), an infrared camera, a RGB-D camera, or the like. Capturing the set of images may include capturing a video (e.g., a 1 second video, a 2 second video, a 5 second video, etc.). The video may be captured continuously after a trigger (e.g., detection of a face). The video may include a sliding window of 1-3 seconds width, used to sample the video frames for the subsequent intent detection operation. Video capture may be stopped when there is no face detected or a door opening decision is made. The facial feature may include one or both eyes of the person. In other examples, the facial feature may include the entire face of the person. Original face and body images may be captured from the camera.

The technique 300 may include an optional operation 305 to perform preprocessing to identify the facial feature, such as a facial landmark. Facial landmarks may be used to extract the eye region images from the original face images. Landmarks may be used to generate a head orientation relative to the camera. Head orientation may be identified based on depth images from an RGB-D camera in some examples. A Facial feature may include one or both eyes of the person, eye region landmarks, such as pupil center, iris boundary, or eye boundary, a whole face image, or the like.

The technique 300 includes an operation 306 to identify, for example using processing circuitry, a gaze status of the person based on the facial feature in the set of images. The gaze status may be identified as being in a direction towards the secure area or the automatic door. The gaze status may include a probability vector of gaze status (e.g., a likelihood of gaze status being towards the door region or not). A trained deep neural network may be used to perform a classification task to generate the gaze status probability vector. Gaze status may be generated based on a single video frame.

The technique 300 includes an operation 308 to determine, for example using a trained machine learning model, an intent of the person to access the secure area or traverse a doorway of the automatic door based on the gaze direction. The trained machine learning model may include a recurrent neural network. In some examples, the trained machine learning model is trained using a plurality of camera positions relative to an access device (e.g., a card reader, a communication device, etc.), for example including the processing circuitry. Operation 308 may include determining the intent based on a detected trajectory of the person, the detected trajectory being obtained from the set of images. In an example, operation 308 may include an integration operation based on the gaze status output of continuous video frames. In this example, a final intent detection result may be generated. In some examples, an N out of M scheme may be used to generate the final result. In other examples, a recurrent neural network may be used to integrate the results and generate the final intent signal. A plurality of camera positions or light source positions may be modeled as 3D coordinates, such as relative to the center of the door. The locations of camera and light sources may be input to generate a gaze status of a single video frame.

The technique 300 includes an operation 310 to, in response to determining the intent, grant access to the secure area or open the automatic door. Operation 310 may include opening a door, barrier, or obstacle blocking access to the secure area or opening the automatic door, or otherwise permitting access to the secure area. In some examples, operation 310 may include logging or flagging a person whose intent to enter a secure area is determined as entering the secure area.

The technique 300 may include, before granting access to the secure area, determining whether the person is authorized to access the secure area. In response to determining the person is authorized to access the secure area, the technique 300 may include granting access to the secure area. In some examples, the technique 300 may include selecting an order of operations for determining the intent or authorizing the person based on a distance of the person to the secure area. For example, when the person is within the particular distance, but outside of a second threshold distance, the order of operations may include authorizing the person first and determining intent second. When the person is within the second threshold distance (which may coincide with or be closer than the particular distance in some examples), the order of operations may include determining intent first and authorizing the person second. This order or the distances (e.g., the particular distance or the second threshold distance) may be customized, for example based on layout of an area surrounding the secure area, user preference, etc. In an example, determining whether the person is authorized to access the secure area may include using the set of images to authenticate the person.

Figure 4:
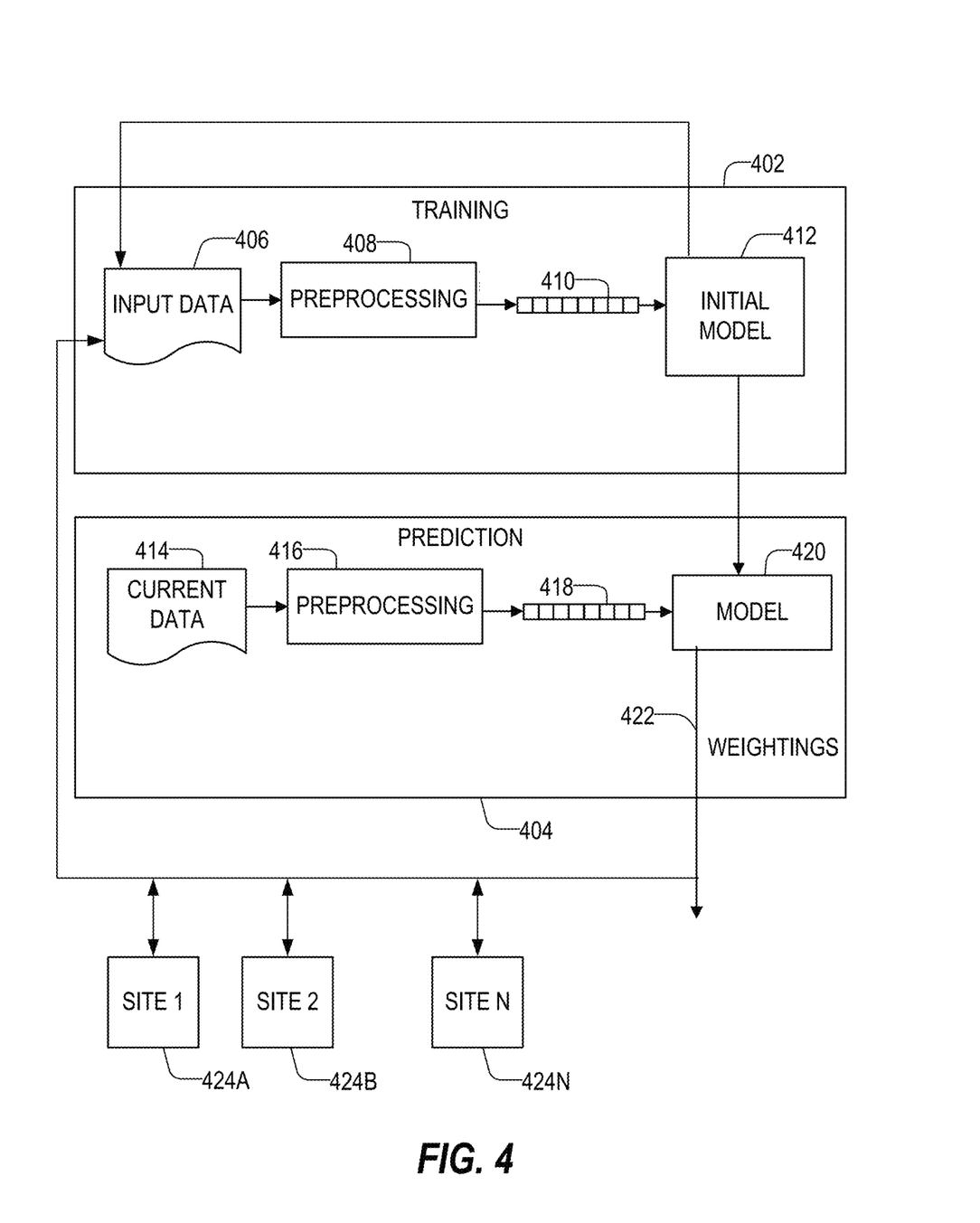
FIG. 4 illustrates machine learning engine for training and execution related to gaze detection or access intent in accordance with some embodiments.

FIG. 4 illustrates a machine learning engine for training and execution related to gaze detection or access intent in accordance with some embodiments. The machine learning engine may be deployed to execute at a computing device (e.g., a secure access device). A system may calculate one or more weightings for criteria based upon one or more machine learning algorithms. FIG. 4 shows an example machine learning engine 400 according to some examples of the present disclosure.

Machine learning engine 400 uses a training engine 402 and a prediction engine 404. Training engine 402 uses input data 406, for example after undergoing preprocessing component 408, to determine one or more features 410. The one or more features 410 may be used to generate an initial model 412, which may be updated iteratively or with future labeled or unlabeled data (e.g., during reinforcement learning), for example to improve the performance of the prediction engine 404 or the initial model 412. An improved model may be redeployed for use.

The input data 406 may include a head orientation vector generated based on a face image (e.g., using facial landmarks) or depth images of an eyeball, user distance or angle, features extracted from eye images, a camera or light source location, images captured or simulated of people gazing at a door or secure area or gazing away (e.g., while moving), simulated data, which may be generated using models of features of an eye (e.g., cornea, pupil, iris, etc.), or the like.

In the prediction engine 404, current data 414 (e.g., a frame captured by a camera of a person within a particular distance of a door or secure area) may be input to preprocessing component 416. In some examples, preprocessing component 416 and preprocessing component 408 are the same. The prediction engine 404 produces feature vector 418 from the preprocessed current data, which is input into the model 420 to generate one or more criteria weightings 422. The criteria weightings 422 may be used to output a prediction, as discussed further below.

The training engine 402 may operate in an offline manner to train the model 420 (e.g., on a server). The prediction engine 404 may be designed to operate in an online manner (e.g., in real-time, at a mobile device, on a wearable device, etc.). In some examples, the model 420 may be periodically updated via additional training (e.g., via updated input data 406 or based on labeled or unlabeled data output in the weightings 422) or based on identified future data, such as by personalizing a general model (e.g., the initial model 412) to a particular installation.

Input data 406 include original video frames acquired within detection proximity, or conditional parameters such as camera or light source location. In some examples, the conditional parameters may include an angle between a user standing point and an intent detection unit, such as when a UWB device is used. Input data 406 may go through the preprocessing step 408 to generate gaze-related features, such as facial landmarks for eye region, paired eye region images, corneal reflection point, pupil center, head orientation, or cropped whole face images. A label of input data 406 may include the gaze status of a single frame (e.g., gaze on or off the door region). Using the labeled data, a first step model may be trained to determine the gaze status of the frame. A second step model, used to integrate the continuous single frame gaze status, may be trained to predict the door opening intent based on single frame results. The outputs of the first step model with label of final door opening intent may be used to train the second step model. The initial model 412 generation may be stopped according to a specified criteria (e.g., after sufficient input data is used, such as 1,000, 10,000, 100,000 data points, etc.) or when data converges (e.g., similar inputs produce similar outputs). The initial pre-trained model 412 may be implemented or tailored to a specific door installation. In some examples, the pre-trained model 412 may be updated using further input data 406 until a satisfactory model 420 is generated. In some examples, federated learning may be used to update a shared model using usage data acquired across different door settings. In federated learning, data from each of two or more sites, such as site 1 424A, site 2 424B, site N 424N, etc. may be used to update the model 420 (or the initial model 412). The data received from these sites may include a local objective function, local weights, etc. The model 420 may use the federated learning process to form a consensus among the various sites 424A-N. The model 420 may be updated and sent to the sites 424A-N for use or further data gathering. Using federated learning may improve the model 420 over time.

The specific machine learning algorithm used for the training engine 402 (e.g., step one or step two models) may be selected from among many different potential machine learning algorithms. Examples of machine learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. In an example, a convolutional neural network is used to extract embeddings from paired eye regions images or cropped whole face images. Subsequently, these embeddings are concatenated with other gaze-related features, such as head orientation, pupil center or iris boundary points related to eye boundary, corneal reflection point, or camera or light source location coordinates. These concatenated features may be input to a classification top, such as a fully connected neural network, Support Vector Machine, or logistic regression model to generate the gaze status of this frame. This gaze status may be a binary output or a probability vector indicating if the subject in this frame puts the gaze on the door region. The gaze status of the single frame may be integrated, such as within a sliding window period to predict the final intent detection result. An N-out-of-M scheme, a recurrent neural network, or Bayesian probability may be used to integrate single frame gaze status and generate the final prediction. Once trained, the model 420 may output a prediction of a gaze intent or a probability of a gaze intent.

Figure 5:
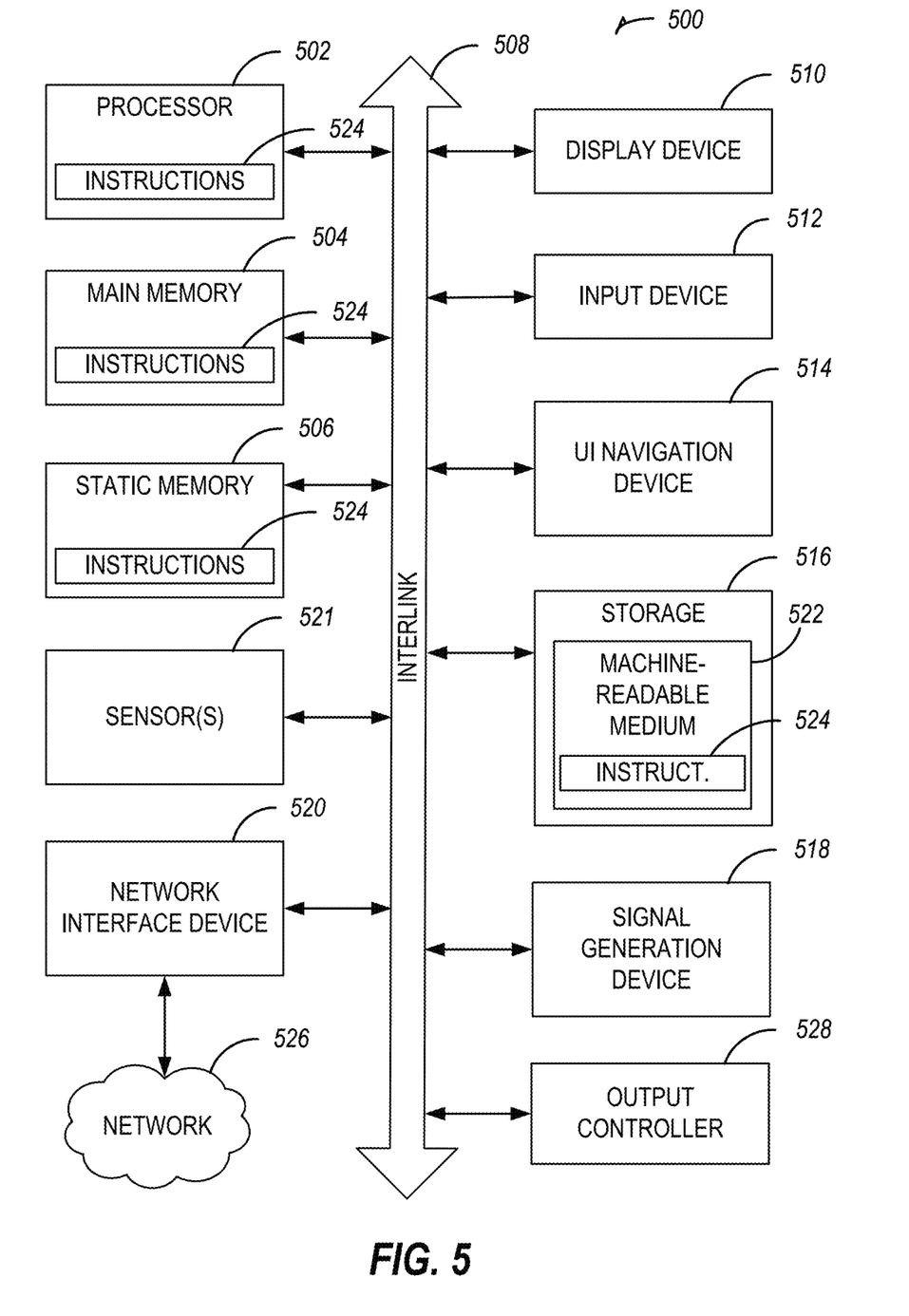
FIG. 5 illustrates generally an example of a block diagram of a machine upon which any one or more of the techniques discussed herein may perform in accordance with some embodiments.

FIG. 5 illustrates generally an example of a block diagram of a machine 500 upon which any one or more of the techniques (e.g., methodologies) discussed herein may perform in accordance with some embodiments. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in a peer-to-peer (P2P) (or other distributed) network environment. The machine 500 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations. Machine 500 may be an example of a computing device 108 or server 106.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include one or more of a display unit 510, an alphanumeric input device 512 (e.g., a keyboard), and a user interface (UI) navigation device 514 (e.g., a mouse). In an example, the display unit 510, alphanumeric input device 512 and UI navigation device 514 may be a touch screen display. The machine 500 may additionally include a storage device (e.g., drive unit) 516, a signal generation device 518, a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., card reader, etc.).

The storage device 516 may include a machine readable medium 522 that is non-transitory on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 500, and includes digital or analog communications signals or other intangible medium to facilitate communication of such software.

Example 1 is a method comprising: detecting a person within a particular distance of a secure area; capturing, using a camera, a set of images of at least a facial feature of the person; preprocessing the set of images to identify the facial feature in at least one image of the set of images; identifying, using processing circuitry, a gaze status of the person based on the identified facial feature in the at least one image; determining, using a trained machine learning model, an intent of the person to access the secure area based on the gaze status; and based on determining the intent, granting access to the secure area.

In Example 2, the subject matter of Example 1 includes, wherein detecting the person within the particular distance includes determining a face size of the person, and comparing the face size to a threshold.

In Example 3, the subject matter of Examples 1-2 includes, wherein granting access to the secure area includes opening a door to the secure area.

In Example 4, the subject matter of Examples 1-3 includes, wherein capturing the set of images includes using two camera lenses that are cross polarized.

In Example 5, the subject matter of Examples 1-4 includes, wherein the camera is an infrared camera.

In Example 6, the subject matter of Examples 1-5 includes, wherein the set of images includes at least one second of video.

In Example 7, the subject matter of Examples 1-6 includes, wherein the facial feature is one or both eyes of the person.

In Example 8, the subject matter of Examples 1-7 includes, wherein the trained machine learning model is a recurrent neural network.

In Example 9, the subject matter of Examples 1-8 includes, wherein the trained machine learning model is trained using a plurality of camera positions relative to an access device including the processing circuitry.

In Example 10, the subject matter of Examples 1-9 includes, wherein the gaze status is identified as being in a direction towards the secure area.

In Example 11, the subject matter of Examples 1-10 includes, wherein determining the intent is based on a detected trajectory of the person, the detected trajectory obtained from the set of images.

In Example 12, the subject matter of Examples 1-11 includes, before granting access to the secure area, determining whether the person is authorized to access the secure area, and based on determining the person is authorized to access the secure area, granting access to the secure area.

In Example 13, the subject matter of Example 12 includes, selecting an order of operations for determining the intent or authorizing the person based on a distance of the person to the secure area.

In Example 14, the subject matter of Examples 12-13 includes, wherein determining whether the person is authorized to access the secure area includes using the set of images to authenticate the person.

Example 15 is at least one machine readable medium including instructions, which when executed by processing circuitry, cause the processing circuitry to perform operations to: detect a person within a particular distance of a secure area; receive, from a camera, a set of images of at least a facial feature of the person; preprocess the set of images to identify the facial feature in at least one image of the set of images; identify a gaze status of the person based on the identified facial feature in the at least one image; determine, using a trained machine learning model, an intent of the person to access the secure area based on the gaze status; and based on determining the intent, grant access to the secure area.

In Example 16, the subject matter of Example 15 includes, wherein the camera is an infrared camera, and wherein capturing the set of images includes using two camera lenses that are cross polarized.

In Example 17, the subject matter of Examples 15-16 includes, wherein the set of images includes at least one second of video.

In Example 18, the subject matter of Examples 15-17 includes, wherein the trained machine learning model is a recurrent neural network.

In Example 19, the subject matter of Examples 15-18 includes, before granting access to the secure area, determining whether the person is authorized to access the secure area, and based on determining the person is authorized to access the secure area, granting access to the secure area.

Example 20 is a system comprising: a camera to capture a set of images of at least a facial feature of a person; processing circuitry; and memory, including instructions, which when executed by the processing circuitry cause the processing circuitry to: detect the person within a particular distance of an automatic door from based on the set of images; preprocess the set of images to identify the facial feature in at least one image of the set of images; identify a gaze status of the person based on the facial feature in the at least one image; determine, using a trained machine learning model, an intent of the person to traverse the automatic door based on the gaze status; and based on determining the intent, output a control signal to open the automatic door.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A method comprising:
    detecting, using a camera, a person within a particular distance of a secure area by determining a face size of the person, and comparing the face size to a threshold;
    identifying, based on comparing the face size to the threshold, that the face size traversed the threshold;
    in response to identifying that the face size traversed the threshold, capturing, using the camera, a set of images of at least a facial feature of the person;
    preprocessing the set of images to identify the facial feature in at least one image of the set of images;
    identifying, using processing circuitry, a gaze status of the person based on the identified facial feature in the at least one image;
    determining, using a trained machine learning model, an intent of the person to access the secure area based on using the gaze status and a second gaze status of a second image of the set of images as input to the trained machine learning model, wherein detecting the person within the particular distance includes comparing the face size to a second threshold different from the threshold, and wherein a result of comparing the face size to the second threshold indicates whether to determine whether the person is authorized to access the secure area first or whether to determine the intent first; and
    based on determining the intent, granting access to the secure area.

2. The method of claim 1, wherein granting access to the secure area includes opening a door to the secure area.

3. The method of claim 1, wherein capturing the set of images includes using two camera lenses that are cross polarized.

4. The method of claim 1, wherein the camera is an infrared camera.

5. The method of claim 1, wherein the set of images includes at least one second of video.

6. The method of claim 1, wherein the facial feature is one or both eyes of the person.

7. The method of claim 1, wherein the trained machine learning model is a recurrent neural network.

8. The method of claim 1, wherein the trained machine learning model is trained using a plurality of camera positions relative to an access device including the processing circuitry.

9. The method of claim 1, wherein the gaze status is identified as being in a direction towards the secure area.

10. The method of claim 1, wherein determining the intent is based on a detected trajectory of the person, the detected trajectory obtained from the set of images.

11. The method of claim 1, further comprising, before granting access to the secure area, determining whether the person is authorized to access the secure area, and based on determining the person is authorized to access the secure area, granting access to the secure area.

12. The method of claim 11, further comprising, selecting an order of operations for determining the intent or authorizing the person based on a distance of the person to the secure area.

13. The method of claim 11, wherein determining whether the person is authorized to access the secure area includes using the set of images to authenticate the person.

14. At least one non-transitory machine readable medium including instructions, which when executed by processing circuitry, cause the processing circuitry to perform operations to:
    detect, using a camera, a person within a particular distance of a secure area by determining a face size of the person, and comparing the face size to a threshold;
    identify, based on comparing the face size to the threshold, that the face size traversed the threshold;
    in response to identifying that the face size traversed the threshold, receive, from the camera, a set of images of at least a facial feature of the person;
    preprocess the set of images to identify the facial feature in at least one image of the set of images;
    identify a gaze status of the person based on the identified facial feature in the at least one image;
    determine, using a trained machine learning model, an intent of the person to access the secure area based on using the gaze status and a second gaze status of a second image of the set of images as input to the trained machine learning model, wherein detecting the person within the particular distance includes comparing the face size to a second threshold different from the threshold, and wherein a result of comparing the face size to the second threshold indicates whether to determine whether the person is authorized to access the secure area first or whether to determine the intent first; and
    based on determining the intent, grant access to the secure area.

15. The at least one non-transitory machine readable medium of claim 14, wherein the camera is an infrared camera, and wherein capturing the set of images includes using two camera lenses that are cross polarized.

16. The at least one non-transitory machine readable medium of claim 14, wherein the set of images includes at least one second of video.

17. The at least one non-transitory machine readable medium of claim 14, wherein the trained machine learning model is a recurrent neural network.

18. The at least one non-transitory machine readable medium of claim 14, further comprising, before granting access to the secure area, determining whether the person is authorized to access the secure area, and based on determining the person is authorized to access the secure area, granting access to the secure area.

19. A system comprising:
a camera to capture a set of images of at least a facial feature of a person;
processing circuitry; and
memory, including instructions, which when executed by the processing circuitry cause the processing circuitry to:
detect the person within a particular distance of an automatic door from based on the set of images by determining a face size of the person, and comparing the face size to a threshold;
identifying, based on comparing the face size to the threshold, that the face size traversed the threshold, wherein the camera is to capture the set of images in response to the processing circuitry identifying that the face size traversed the threshold;
preprocess the set of images to identify the facial feature in at least one image of the set of images;
identify a gaze status of the person based on the facial feature in the at least one image;
determine, using a trained machine learning model, an intent of the person to traverse the automatic door based on using the gaze status and a second gaze status of a second image of the set of images as input to the trained machine learning model, wherein detecting the person within the particular distance includes comparing the face size to a second threshold different from the threshold, and wherein a result of comparing the face size to the second threshold indicates whether to determine whether the person is authorized to access the automatic door or whether to determine the intent first; and
based on determining the intent, output a control signal to open the automatic door.

* * * * *